United States Patent [19]

Nagao et al.

[11] Patent Number: 5,792,809
[45] Date of Patent: Aug. 11, 1998

[54] POLYVINYL ALCOHOL SHAPED ARTICLE

[75] Inventors: Masahiro Nagao; Masato Nakamae; Takeshi Kusudou; Hirotoshi Miyazaki, all of Kurashiki, Japan

[73] Assignee: Kuraray Co., Ltd., Kurashiki, Japan

[21] Appl. No.: 834,875

[22] Filed: Apr. 10, 1997

[30] Foreign Application Priority Data

Apr. 10, 1996 [JP] Japan .................................. 8-087781

[51] Int. Cl.⁶ ...................................................... C08L 29/04
[52] U.S. Cl. .......................... 524/503; 523/200; 523/206; 525/57; 525/58; 525/60; 525/61
[58] Field of Search .................... 525/57, 58, 61, 525/60; 523/200, 206; 524/503

[56] References Cited

U.S. PATENT DOCUMENTS 2,277,259  3/1942  Schnabel et al. ...................... 524/313

FOREIGN PATENT DOCUMENTS 0 124 782  11/1984  European Pat. Off. .
0 157 612  10/1985  European Pat. Off. .
60-248763  12/1985  Japan .
5-78540  3/1993  Japan .

*Primary Examiner*—Tae Yoon
*Attorney, Agent, or Firm*—Oblon, Spivak, McClelland, Maier & Neustadt, P.C.

[57] ABSTRACT

Disclosed herein is a polyvinyl alcohol shaped article which comprises a polyvinyl alcohol (A) and rubber particles (B), said rubber particles (B) comprising a rubber component having a glass transition temperature of 5° C. or less and an average particle diameter of 5 μm or less and a polyvinyl alcohol (C) being bonded to the surface of said rubber component, with the weight ratio of said rubber component on the basis of the total weight of said polyvinyl alcohols being in the range of 0.03 to 2. The polyvinyl alcohol shaped article of the present invention has a high impact strength at low temperatures and in low humidity, and also has a high strength and Young's modulus in high humidity, and has an excellent appearance.

15 Claims, No Drawings

POLYVINYL ALCOHOL SHAPED ARTICLE

BACKGROUND OF THE INVENTION

1. Field of the Invention

The present invention relates to a polyvinyl alcohol shaped article which has an improved impact resistance at low temperature and in low humidity and an excellent appearance.

2. Description of the Related Arts

Polyvinyl alcohol (hereinafter referred to as "PVA") has been widely used for packaging materials and containers in the form of film and bottle because it is superior in gas barrier properties, transparency, oil resistance, water solubility, strength, etc.

However, PVA films have the disadvantage of becoming rigid and brittle and hence decreasing in strength at low temperature and in low humidity. This poses a problem of breakage and crack of packaging materials and containers and therefore leakage of contents during conveyance and transportation. An attempt to improve these properties of becoming rigid and brittle at low temperature and in low humidity was to blend, into PVA, a polyhydric alcohol (such as glycerin and ethylene glycol) or a derivative thereof which functions as a plasticizer. Unfortunately, this attempt cannot sufficiently improve the impact resistance at low temperature and in low humidity, and gives problems of decrease in strength and modulus and blocking of films each other in high humidity in the case where a large amount of plasticizer is used.

Recently, an attempt to improve polystyrene and polyacrylate in impact resistance was conducted to disperse a rubber component into the polymer matrix. However, in the case of PVA, rubber particles cannot be uniformly dispersed into the polymer matrix, the sufficient amount of the rubber component to improve the impact resistance cannot be blended, PVA blended with rubber particles has a problem of a poor appearance.

SUMMARY OF THE INVENTION

It is an object of the present invention to provide a polyvinyl alcohol shaped article which has a high strength and a high modulus in high humidity, and has an improved impact resistance at low temperature and in low humidity, and also has an excellent appearance.

In order to solve the above-mentioned problems, the present inventors carried out an intensive study, which led to the completion of the present invention. The present invention is a polyvinyl alcohol shaped article which comprises a polyvinyl alcohol (A) and rubber particles (B), said rubber particles (B) comprising a rubber component having a glass transition temperature of 5° C. or less and an average particle diameter of 5 µm or less and a polyvinyl alcohol (C) being bonded to the surface of said rubber component, with the weight ratio of said rubber component on the basis of the total weight of said polyvinyl alcohols being in the range of 0.03 to 2.

DETAILED DESCRIPTION OF THE PREFERRED EMBODIMENTS

A detailed description of the present invention follows.

The PVA shaped article according to the present invention is a shaped article comprising a PVA (A) and rubber particles (B). Among the shaped articles of the present invention, it is preferably where the PVA (A) forms a continuous phase and the rubber particles (B) are dispersed as islands in the continuous phase.

The PVA (A) to be used in the present invention is a polymer which has vinyl alcohol units.

The viscosity-average degree of polymerization (hereinafter referred to as "degree of polymerization") of the PVA is preferably 200 to 18000. In the case of melt processing, the degree of polymerization is preferably 300 to 2000. In the case of solution processing, the degree of polymerization is preferably 1000 to 8000. If the degree of polymerization is too low, the shaped article becomes poor in strength. If the degree of polymerization is too high, the processing characteristics become poor due to a high solution viscosity or a high melt viscosity.

The degree of hydrolysis is preferably at least 50 mol %, more preferably at least 65 mol %, and most preferably at least 70 mol %. The most desirable degree of hydrolysis is 80 to 100 mol % from the standpoint of compatibility with rubber particles and plasticizer. If the degree of hydrolysis is too low, the PVA becomes soft and poor in strength and modulus at high temperature or in high humidity and becomes rigid and brittle at low temperature.

There are no specific restrictions on the process of producing the PVA, but it can be generally produced by the hydrolysis or alcoholysis of a polyvinyl ester. The polyvinyl ester includes a homopolymer of vinyl ester, a copolymer of two or more of vinyl ester, and a copolymer of vinyl ester and ethylenically unsaturated monomer. Examples of the vinyl ester are vinyl formate, vinyl acetate, vinyl propionate, vinyl versatate, and vinyl pivalate. Of these monomers, vinyl acetate is commonly used because of its low commercial price.

The PVA to be used in the present invention may be formed from a copolymer of vinyl ester and other monomer or from a copolymer modified at an end by the use of a chain transfer agent. The ethylenically unsaturated monomer to be copolymerized with vinyl ester is not specifically restricted so long as it is capable of copolymerization with vinyl ester. Examples of the ethylenically unsaturated monomer are a-olefin, halogen-containing monomer, carboxyl group-containing monomer (and anhydride or ester thereof), (meth)acrylate ester, vinyl ether, sulfonic group-containing monomer, amide group-containing monomer, amino group-containing monomer, quaternary ammonium-containing monomer, silyl group-containing monomer, hydroxyl group-containing monomer, and acetyl group-containing monomer.

Examples of the method of polymerization are solution polymerization, bulk polymerization, pearl polymerization, and emulsion polymerization.

The rubber particles (B) to be used in the present invention have the PVA (C) being bonded to the surface of the rubber component. The bond between the rubber component and the PVA (C) is enough for the rubber particles not to aggregate when the PVA (A) (as the matrix of the shaped article) is dissolved in water. As the bond, a chemical bond is preferable, and a graft bond is more preferable.

The degree of polymerization and the degree of hydrolysis of the PVA (C) being bonded to the surface of the rubber component is preferably determined in consideration of its compatibility with the PVA (A) as the matrix and the readiness of its bonding to the rubber component.

The weight ratio of the PVA (C) on the basis of the rubber component is preferably at least 0.005, more preferably at least 0.02, more preferably 1 to 50, and most preferably 1 to 30. The weight ratio is selected according to the particle diameter of the rubber particles, the composition of the rubber component, and the weight ratio of the rubber component in the shaped article.

The rubber particles (B) can be produced in several ways as follows.

Reaction of rubber component with PVA by melt mixing (for microdispersion of rubber component into PVA) and ensuing pulverization into particles.

Bonding of PVA to the surface of rubber component after shaping rubber component.

Emulsion polymerization of rubber component by using PVA as a dispersing stabilizer.

Of these methods, the emulsion polymerization of rubber component by using PVA as a dispersing stabilizer is preferable. The emulsion polymerization of rubber component by using a mercapto group-containing PVA as a dispersing stabilizer is the best to bond PVA to the surface of rubber component, and gives rubber particles having a highly grafted ratio of PVA.

The degree of polymerization of the mercapto group-containing PVA is preferably 50 to 3000, more preferably 100 to 2000. The degree of hydrolysis of the mercapto group-containing PVA is preferably so that it is soluble or dispersible in water, and more preferably 60 to 100 mol %, most preferably 75 to 100 mol %.

The mercapto group in PVA may be at an end or side chain of PVA, but preferably at one end thereof.

The mercapto group-containing PVA can be produced by the method disclosed in Japanese Patent Application Laid-open No. 187003/1984. It may be copolymerized with ethylenically unsaturated monomer units other than vinyl alcohol unit's and vinyl acetate units in an amount not to impair the effect of the present invention.

The mercapto group-containing PVA as a dispersing stabilizer for emulsion polymerization can be used alone or in combination with other stabilizers. Examples of these stabilizers to be used in combination are various kinds of anionic, cationic, and nonionic surfactants and water-soluble polymers, which are used for emulsion polymerization.

A detailed description is given below of the rubber particles obtained by the emulsion polymerization of rubber component using a mercapto group-containing PVA as a dispersing stabilizer.

Examples of the method of the emulsion polymerization are homopolymerization or copolymerization of ethylenically unsaturated monomer or diene monomer capable of radical polymerization (disclosed in Japanese Patent Application Laid-open No. 197229/1985).

The examples of the initiators to be used for the emulsion polymerization are water-soluble polymerization initiators, such as potassium bromate, potassium persulfate, ammonium persulfate, 2,2-azobis(2-amidinopropane) hydrochloride, azobiscyanovaleric acid, and t-butylhydroperoxide.

Examples of the ethylenically unsaturated monomer or diene monomer to be used for the monomer of the rubber component are vinyl ester monomer, a-olefin, halogen-containing monomer, carboxyl group-containing monomer (and anhydride or ester thereof), (meth)acrylate ester, vinyl ether, sulfonic group-containing monomer, amide group-containing monomer, amino group-containing monomer, quaternary ammonium-containing monomer, silyl group-containing monomer, hydroxyl group-containing monomer, acetyl group-containing monomer. Of these monomers, (meth)acrylate ester is preferable.

The glass transition temperature (Tg) of the rubber component is 5° C. or lower, preferably –5° C. or lower, most preferably –15° C. or lower. The lower limit of the glass transition temperature is preferably about –100° C. In the case where the glass transition temperature is higher than 5° C., it becomes poor in impact resistance at low temperature, the shaped article becomes friable.

Examples of the method to obtain the glass transition temperature of the rubber component of 5° C. or lower are to regulate the composition of the rubber component or to blend a plasticizer into the rubber component.

The rubber particles obtained as mentioned above can be used in the form of aqueous dispersion or used after drying or concentration.

According to the present invention, the average particle diameter of the rubber particles is 5 µm or less, preferably 1 µm or less, most preferably 0.8 µm or less. The lower limit of the particle diameter is preferably 0.005 µm, more preferably 0.01 µm. In the case where the average particle diameter is larger than 5 µm, the sufficient impact strength cannot be obtained.

In the shaped article according to the present invention, the weight ratio of the rubber component on the basis of the total weight of PVAs (the total amount of PVA (A) and PVA (C)) is 0.03 to 2, preferably 0.05 to 1.5, more preferably 0.1 to 1, and most preferably 0.15 to 1. In the case where the weight ratio is 0.03 or less, the sufficient impact resistance cannot be obtained. And in the case where the weight ratio is more than 2, the strength and elongation of the shaped article become low.

Examples of the method of blending rubber particles (B) into PVA (A) are method of blending rubber particles Into PVA and ensuing shaping article (hereinafter referred to as "method (A)"), method of blending rubber particles in PVA at the time of shaping (hereinafter referred to as "method (B)"), method of dipping of a PVA shaped article In a dispersion of rubber particles, thereby impregnating rubber particles into the PVA shaped article (hereinafter referred to as "method (C)").

Of these methods, the method (A) and method (B) are preferable. An example of Method (A) is method of shaping from a liquid mixture of PVA and rubber particles. An example of Method (B) is method of blending rubber particles at the time of extruding an aqueous solution of PVA.

In the shaped article according to the present invention, the weight ratio of the plasticizer for PVA on the basis of total weight of PVAs (total amount of PVA (A) and PVA (C)) is preferably 0.01 to 1, more preferably 0.03 to 1, and most preferably 0.05 to 0.8.

The plasticizer is not specifically restricted so long as it lowers the glass transition temperature of PVA. Examples of the plasticizer are water, glycol derivatives (ex. ethylene glycol and oligomer thereof, polyethylene glycol, propylene glycol and oligomer thereof, polypropylene glycol), glycerin, glycerin derivatives (ex. glycerin oligomer, polyglycerin, adduct of glycerin with ethylene oxide or propylene oxide), sorbitol, and sorbitol derivatives (adduct of sorbitol with ethylene oxide or propylene oxide). Among these, preferable examples are polyhydric alcohols and derivatives thereof, such as glycerin, ethylene glycol, propylene glycol, and sorbitol.

These plasticizers can be used alone or in combination with other one.

The shaped article of the present invention can be produced by various shaping methods, such as melt shaping, injection shaping, and press shaping, shaping from solution.

A method of shaping from a PVA solution is explained below. Examples of the solvent for preparing PVA solution are dimethylsulfoxide, dimethylformamide, dimethylacetamide, N-methylpyrrolidone, ethylene glycol, propylene glycol, glycerin, ethylene diamine, diethylene triamine, and water. These solvents can be used alone or in combination with others. An aqueous solution of inorganic salt (such as lithium chloride and calcium chloride) may be used alone or in combination with the above-mentioned organic solvents. Examples of the solvent are water (used alone), a mixed solvent of water and dimethylsulfoxide or dimethylformamide, a solvent of glycol such as glycerin.

The concentration of the PVA solution depends on the degree of polymerization of PVA and the method of shaping employed. It is usually 1 to 95 wt %, preferably 1.5 to 60 wt %. The PVA solution is usually prepared at a temperature of room temperature to 150° C. The solution is preferably prepared at temperature as low as possible in the above-mentioned range (depending on the solvent used) to minimize the decrease in degree of polymerization due to the decomposition of PVA.

Examples of the method of shaping film are cast film process from a PVA solution, dry film process, extrusion process into air or an inert gas such as nitrogen. A wet process by extruding a PVA solution into a poor solvent is available. There is also a dry-wet process by extruding a PVA solution into air or an inert gas (such as nitrogen), thereby forming a liquid film, and introducing the liquid film into a solidifying medium, thereby shaping a film. Furthermore, these processes can be combined, and it is also possible to convert the liquid film into a film by cooling for gelation.

Cast film process and dry film process, which are the common methods of producing PVA film, are the methods of casting a PVA solution onto a rotating drum or a running endless belt, thereby shaping a liquid film, and then drying the liquid film to remove the solvent.

The shaped article according to the present invention can be used for the application areas of packaging and containers for textile products, garments, electronic products, medical and biochemical wastes, detergents, chemicals, pesticides, dyes, etc. In addition, the shaped article of the present invention may be blended with an additive, modifier, filler, etc. or surface-finished to such an extent that the feature of the present invention is not impaired.

The shaped article according to the present invention exhibits high impact strength at low temperature and in low humidity and also exhibits high strength and Young's modulus in high humidity, and also has an excellent appearance.

EXAMPLES

To further illustrate the present invention, the following examples are given. However, the present invention in not restricted by the following examples. Unless otherwise specified, "parts" and "%" mean "parts by weight" and "wt %", respectively.

Samples were tested for physical properties according to the following methods.

(1) Glass Transition Temperature

The glass transition temperature (hereinafter referred to as "Tg") of the rubber component is calculated from Fox equation below.

$$1/Tg = \Sigma(Wi/Tgi)$$

where Wi denotes the weight fraction of component (i) and Tgi denotes the Tg of component (i).

The Tg of each component originates from "Polymer Handbook" (John Wiley & Sons, Inc.) The symbol $\Sigma$ indicates the summation of all components.

(2) Impact Resistance

A sample of film (measuring 20 cm long, 10 cm wide, and 0.05 mm thick) is folded back, and two sides are heat-sealed to make a bag (measuring 10 cm long and 10 cm wide). This bag is filled with "Toyoura" standard sand and the mouth is heat-sealed. After aging for 7 days at 5° C. and 40% RH, this package sample is dropped onto a stainless steel plate (8 mm thick) from a height of 2 m. The package sample is inspected for breakage.

(3) Strength, Elongation, and Young's Modulus of Film

After aging for 7 days at 20° C. and 84% RH, a sample of film (measuring 10 mm wide and 0.05 mm thick) is measured for the maximum strength, elongation at break, and Young's modulus by pulling at a rate of 500%/min.

(4) Average Particle Diameter

An aqueous dispersion of rubber particles prepared by emulsion polymerization is measured for particle diameter by using a particle size distribution meter (Model ELS-800, from Outsuka Densi Co., Ltd.).

(5) Graft Ratio of PVA onto Rubber Component

Measured according to the method proposed by Outsuka et al. (Outsuka and Fujii, "Koubunshi Kagaku" 25, 375 (1968)) This method is dispersing rubber particles into deionized water, centrifugally separating rubber particles, and determining the concentration of PVA in the supernatant liquid by colorimetry (method of measuring color developed by iodine). The amount of PVA grafted onto rubber component is calculated from the amount of PVA used for emulsion polymerization and the amount of PVA found in the supernatant liquid.

(6) Amount of PVA Being Bonded to Rubber Component

The matrix of the shaped article is dissolved in water and rubber particles are centrifugally separated from the aqueous solution. The separated rubber particles are thoroughly washed with water. The separated rubber particles are treated with periodic acid to sever the bond between PVA and rubber component. The amount of isolated PVA is determined by a known method.

Examples 1 to 9 and Comparative Examples 1 to 8

(1) Preparation of Aqueous Emulsion of Rubber Particles

Emulsion polymerization was carried out as follows by the known method to prepare samples of aqueous emulsions. The compositions are shown in Table 1.

Initiator: potassium persulfate

Monomer charging: all at once

Polymerization temperature: 70° C.

The physical properties of the obtained emulsion are shown in Table 2.

(2) Preparation of Film

A 10% aqueous solution was prepared from PVA, an aqueous emulsion of rubber particles, and a plasticizer according to the formulation (in terms of solids) shown in Table 3. The aqueous solution was cast onto a polyester film to form a liquid film. This liquid film was dried at 70° C. for 1 hour, followed by heat treatment at 120° C. for 10 minutes, and the film was obtained. The physical properties of the film are shown in Table 4.

TABLE 1

| code of rubber particles (*1) | Composition at the time of emulsion polymerization ||||||||
|---|---|---|---|---|---|---|---|---|
| | Dispersing stabilizer ||||| Monomer || Water |
| | Kind (*2) | DP (*3) | DH (*4) (mol %) | [SH] (*5) (eq/g) | Amount (parts) | Kind (*6) | Amount (parts) | Amount (parts) |
| EMR-1 | SH-PVA | 520 | 88.4 | $4.92 \times 10^{-5}$ | 20 | n-BuA | 100 | 350 |
| EMR-2 | SH-PVA | 1550 | 88.6 | $1.60 \times 10^{-5}$ | 15 | n-BuA MMA | 90 10 | 250 |
| EMR-3 | SH-PVA | 1550 | 88.6 | $1.60 \times 10^{-5}$ | 15 | n-BuA MMA | 45 55 | 350 |
| EMR-4 | SH-PVA | 1550 | 99.5 | $1.87 \times 10^{-5}$ | 15 | n-BuA MMA | 90 10 | 400 |
| EME-5 | SH-PVA | 1000 | 96.0 | $2.80 \times 10^{-5}$ | 5 | n-BuA | 100 | 350 |
| EMR-6 | NM-PVA | 1750 | 88.5 | 0 | 15 | n-BuA | 100 | 400 |
| EMR-7 | SLS | — | — | — | 3 | n-BuA MMA | 90 10 | 250 |
| EMR-8 | — | — | — | — | 0 | n-BuA | 25 | 400 |

(*1) Code of rubber particles: code of aqueous emulsion of rubber particles
(*2) Kind of dispersing stabilizer:
SH-PVA: PVA having a mercapto group at one end thereof
NM-PVA: non-modified PVA
SLS: sodium lauryl sulfate ester
(*3) DP: degree of polymerization of PVA
(*4) DH: degree of hydrolysis of PVA
(*5) |SH|: content of mercapto groups in PVA
(*6) kind of monomer: monomer from which the rubber component is produced.
n-BuA: n-butyl acrylate,
MMA: methyl methacrylate

TABLE 2

Physical properties of aqueous emulsion

| Code of rubber particles (*1) | Average particle diameter (μm) | Tg of rubber component (°C.) | Concentration of solids (%) | Weight ratio of grafted PVA (C) (*2) |
|---|---|---|---|---|
| EMR-1 | 0.15 | −54 | 25.3 | 0.158 |
| EMR-2 | 0.20 | −44 | 30.1 | 0.111 |
| EME-3 | 0.18 | 12 | 23.6 | 0.112 |
| EMR-4 | 0.23 | −44 | 21.2 | 0.117 |
| EMR-5 | 0.71 | −54 | 22.8 | 0.038 |
| EMR-6 | 0.30 | −54 | 20.5 | 0 |
| EMR-7 | 0.14 | −44 | 27.5 | 0 |
| EMR-8 | 7.4 | −54 | 5.8 | 0 |

(*1) Code of rubber particles: code of aqueous emulsion of rubber particles
(*2) Weight ratio of grafted PVA, calculated by dividing the weight of grafted PVA by the weight of rubber component

TABLE 3

| Example (Comparative Example) | Composition of film |||||| |
|---|---|---|---|---|---|---|
| | PVA (A) for continuous phase ||| Rubber particles (B) || Plasticizer ||
| | DP (*1) | DH (*2) (mol %) | Comonomer (*3) | Code of rubber particles (*4) | Ratio (by weight) of rubber component (*5) | Kind | Amount (*6) |
| Ex. 1 | 1750 | 88.4 | — | EMR-1 | 0.25 | — | 0 |
| Ex. 2 | 1750 | 88.5 | AMPS (2 mol %) | EMR-1 | 0.20 | — | 0 |
| Ex. 3 | 1750 | 88.4 | — | EMR-2 | 0.25 | — | 0 |
| Ex. 4 | 1750 | 88.4 | — | EMR-5 | 0.25 | — | 0 |
| Ex. 5 | 1750 | 98.5 | — | EMR-4 | 0.30 | glycerin | 0.14 |
| Ex. 6 | 1050 | 98.5 | — | EMR-4 | 0.20 | glycerin | 0.19 |
| Ex. 7 | 2400 | 88.6 | — | EMR-1 | 0.50 | glycerin | 0.11 |
| Ex. 8 | 2400 | 88.6 | — | EMR-1 | 0.05 | glycerin | 0.12 |
| Ex. 9 | 1750 | 88.4 | — | EMR-1 | 1.30 | — | 0 |
| Comp. Ex 1 | 1750 | 88.5 | — | — | 0 | — | 0 |
| Comp. Ex 2 | 1750 | 88.5 | — | — | 0 | glycerin | 0.30 |
| Comp. Ex 3 | 1750 | 88.5 | — | EMR-1 | 0.008 | — | 0 |
| Comp. Ex 4 | 1750 | 88.5 | — | EMR-1 | 3.20 | — | 0 |

TABLE 3-continued

| | Composition of film | | | | | | |
|---|---|---|---|---|---|---|---|
| Example | PVA (A) for continuous phase | | | Rubber particles (B) | | Plasticizer | |
| (Comparative Example) | DP (*1) | DH (*2) (mol %) | Comonomer (*3) | Code of rubber particles (*4) | Ratio (by weight) of rubber component (*5) | Kind | Amount (*6) |
| Comp. Ex 5 | 1750 | 58.5 | — | EMR-6 | 0.20 | — | 0 |
| Comp. Ex 6 | 1750 | 88.5 | — | EMR-3 | 0.25 | — | 0 |
| Comp. Ex 7 | 1750 | 88.5 | — | EMR-7 | 0.25 | — | 0 |
| Comp. Ex 8 | 1750 | 88.5 | — | EMR-8 | 0.25 | — | 0 |

(*1) DP: degree of polymerization of PVA
(*2) DH: degree of hydrolysis of PVA
(*3) Comonomer: AMPS: sodium 2-acrylamide-2-methylpropane sulfonate
(*4) Code of rubber particles: code of aqueous emulsion of rubber particle
(*5) Weight ratio of rubber component: ratio of rubber component on the basis of the total weight of PVAs
(*6) Amount of plasticizer: weight ratio on the basis of the total weight of PVAs

TABLE 4

| | Physical properties of film | | | | | |
|---|---|---|---|---|---|---|
| | | Strength and elongation (*2) | | | | |
| Example | Impact resistance (*1) | Maximum strength (kg/mm$^2$) | Elongation at break (%) | Young's modulus (kg/mm$^2$) | Transparency (*3) | Overall rating (*4) |
| Ex. 1 | good 8 | 3.9 | 231 | 6.3 | excellent | good |
| Ex. 2 | good 9 | 2.5 | 282 | 3.4 | excellent | good |
| Ex. 3 | good 8 | 3.2 | 261 | 6.5 | excellent | good |
| Ex. 4 | good 7 | 2.9 | 223 | 6.4 | excellent | good |
| Ex. 5 | excellent 10 | 3.5 | 285 | 4.1 | excellent | excellent |
| Ex. 6 | excellent 10 | 3.4 | 274 | 3.6 | excellent | excellent |
| Ex. 7 | excellent 10 | 4.1 | 265 | 3.5 | excellent | excellent |
| Ex. 8 | good 5 | 4.3 | 241 | 3.6 | excellent | good |
| Ex. 9 | excellent 10 | 3.2 | 250 | 2.8 | good | good |
| Comp. Ex 1 | bad 0 | 3.4 | 251 | 6.5 | excellent | bad |
| Comp. Ex 2 | poor 4 | 1.1 | 351 | 1.1 | excellent | bad |
| Comp. Ex 3 | bad 0 | 3.5 | 248 | 6.2 | excellent | bad |
| Comp. Ex 4 | excellent 10 | 0.6 | 254 | 0.8 | bad | bad |
| Comp. Ex 5 | poor 3 | 2.9 | 115 | 6.3 | excellent | poor |
| Comp. Ex 6 | bad 1 | 3.2 | 103 | 6.3 | bad | poor |
| Comp. Ex 7 | (*5) | (*5) | (*5) | (*5) | bad | bad |
| Comp. Ex 8 | (*5) | (*5) | (*5) | (*5) | bad | bad |

(*1) Impact resistance: impact resistance at low temperatures and in low humidity (5° C., 40% RH). The numeral indicates the number of samples out of ten which did not break in the drop test.
(*2) Strength and elongation: mechanical properties in high humidity (20° C., 84% RH).
(*3) Transparency of film: transparency of film without pigment was observed, rated as excellent (clear), good (slightly cloudy), and bad (cloudy).
(*4) Overall rating: based on impact resistance at low temperature and in low humidity, strength and elongation in high humidity, and appearance.
(*5) No uniform film was obtained due to aggregation of rubber particles.

What is claimed is:

1. A shaped polyvinyl alcohol (PVA) article which comprises a polyvinyl alcohol (A) and rubber particles (B), said rubber particles (B) comprising a rubber component having a glass transition temperature of 5° C. or less and an average particle diameter of 5 μm or less and a polyvinyl alcohol (C) being bonded to the surface of said rubber component, with the weight ratio of said rubber component to the total weight of said polyvinyl alcohols being in the range of 0.03 to 2.

2. The shaped polyvinyl alcohol article according to claim 1, which contains a plasticizer for the polyvinyl alcohol component, with the weight ratio of said plasticizer to the total weight of said polyvinyl alcohols being in the range of 0.01 to 1.

3. The shaped polyvinyl alcohol article according to claim 1, wherein said PVA has a viscosity-average degree of polymerization ranging from 200–18,000.

4. The shaped polyvinyl alcohol article according to claim 1, wherein the PVA has a degree of hydrolysis of at least 50 mol. %.

5. The shaped polyvinyl alcohol article according to claim 4, wherein said degree of hydrolysis is at least 65 mol. %.

6. The shaped polyvinyl alcohol article according to claim 1, wherein said PVA is a copolymer of a vinyl ester and another monomer selected from the group consisting of α-olefins, halogen-containing ethylenically unsaturated monomers, carboxyl group containing ethylenically unsaturated monomers and anhydride and esters thereof, (meth) acrylate ester, vinyl ether, sulfonic acid group containing ethylenically unsaturated monomer, amide group containing unsaturated monomer, amino group containing ethylenically unsaturated monomer, quaternary ammonium group containing ethylenically unsaturated monomer, silyl group containing ethylenically unsaturated monomer, hydroxyl group containing ethylenically unsaturated monomer and acetyl group containing ethylenically unsaturated monomer.

7. The shaped polyvinyl alcohol article according to claim 1, wherein the weight ratio of PVA (C) to the rubber component is at least 0.005.

8. The shaped polyvinyl alcohol article according to claim 7, wherein said weight ratio is at least 0.02.

9. The shaped polyvinyl alcohol article according to claim 8, wherein said weight ratio ranges from 1–50.

10. The shaped polyvinyl alcohol article according to claim 1, wherein said glass transition temperature of said rubber component is 5° C. or less down to a lower limit of about −100° C.

11. The shaped polyvinyl alcohol article according to claim 1, wherein the average particle diameter of the rubber particles is 5 μm or less down to a lower limit of 0.005 μm.

12. The shaped polyvinyl alcohol article according to claim 11, wherein said average particle diameter ranges from 1 μm or less down to about 0.01 μm.

13. The shaped polyvinyl alcohol article according to claim 1, wherein the weight ratio of said rubber component to the total weight of said polyvinyl alcohols ranges from 0.05–1.5.

14. The shaped polyvinyl alcohol article according to claim 13, wherein said weight ratio ranges from 0.1–1.

15. The shaped polyvinyl alcohol article according to claim 2, wherein the weight ratio of said plasticizer to the total weight of said polyvinyl alcohols ranges from 0.03–1.

* * * * *